UNITED STATES PATENT OFFICE.

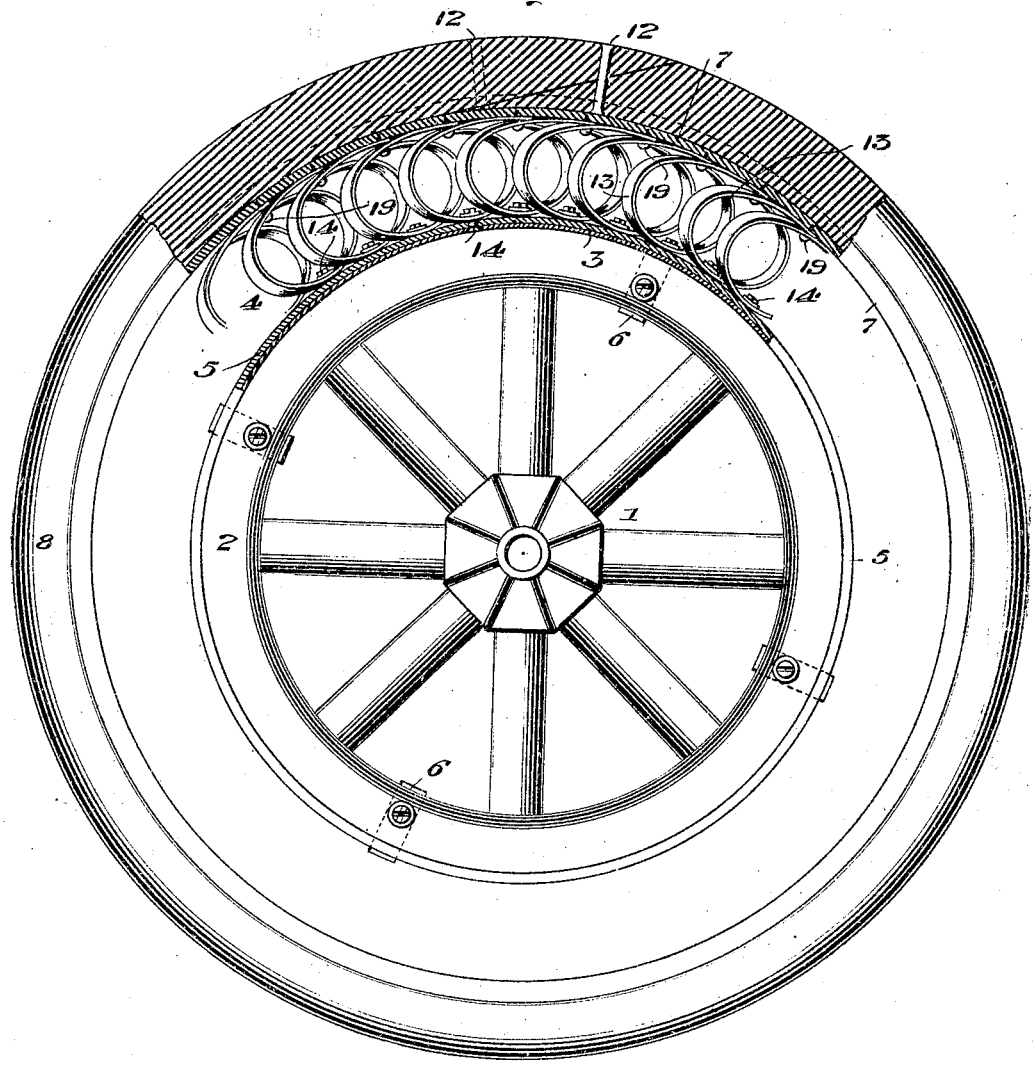

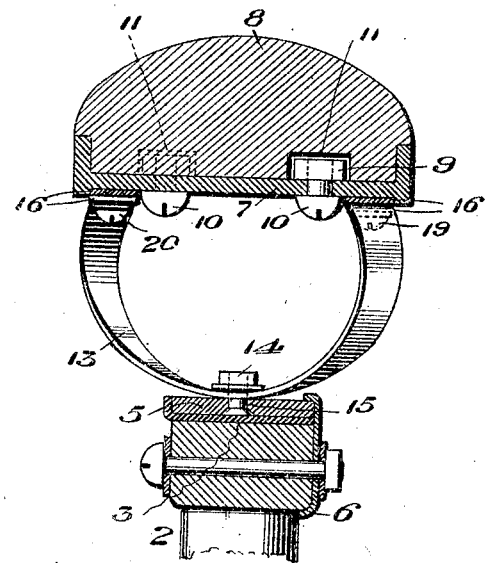
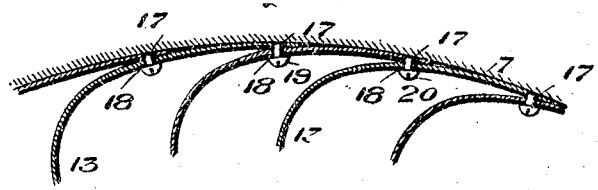
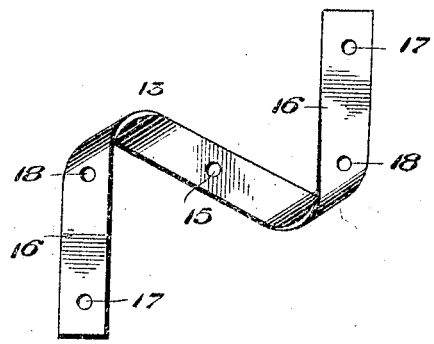

LOUI COMPE, OF BUTTE, MONTANA.

DEMOUNTABLE SPRING-TIRE.

1,378,246.  Specification of Letters Patent.  Patented May 17, 1921.

Application filed August 23, 1920. Serial No. 405,248.

*To all whom it may concern:*

Be it known that I, LOUI COMPE, a citizen of the United States, residing at Butte, in the county of Silver Bow and State of Montana, have invented certain new and useful Improvements in Demountable Spring-Tires, of which the following is a specification.

This invention relates to spring wheels and has for its object the provision, first, of springs of improved form disposed between an outer rim and an inner band or rim whereby an evenly distributed cushioning action will be obtained accompanied by great strength and resistance to torsional effect; second, of a spring of improved form adapted particularly for use as a resilient element in a spring wheel; third, of a resilient structure for spring wheels which comprises springs of improved form, having their ends overlapped and related in a novel manner and being interposed and connected to inner and outer rims; fourth, of a spring wheel having an outer demountable self-contained resilient section comprising inner and outer rims and springs connecting them, and a hub and felly unit for demountably carrying the aforesaid unitary resilient part of the wheel whereby the latter may be taken off for repairs.

My invention affords ample resiliency, with adaptability for quick and easy removal of any spring and substitution of another spring therefor, without disturbing the remaining springs of the resilient structure. The spring wheel is designed as a substitute for ordinary pneumatic wheels and tires for all makes and sizes of passenger automobile or truck wheels and tires.

In the accompanying drawings:—

Figure 1 is a side elevation, partly in section, showing a few of the numerous springs;

Fig. 2 is a detail cross section through the wheel;

Fig. 3 is a detail section showing a few of the springs and illustrating the manner in which they are fastened; and Fig. 4 is a detail plan view of one of the springs.

The wheel proper is shown at 1 and may have any suitable hub, spokes, and rim, the latter appearing at 2, and being provided with a metallic felly 3. The self-contained unitary wheel structure is shown generally at 4 and it has an ordinary rim or band 5 which is adapted to be slipped over the rim or felly 3 and to be held by an ordinary type of clamp 6. This arrangement enables the unitary self-contained tire structure 4 to be readily put on or taken off the wheel for purposes of inspection or repair.

The outer band or rim of the unitary demountable resilient tire appears at 7 and it may be of any preferred form and provided with any kind of a tire 8, as, for instance, a cushion tire, held in any suitable manner, as, for instance, by the nuts 9 of the bolts 10 which enter in sockets 11 on the inner side of the tire 8. The ends of the cushion tire 8 may be lapped and secured by connections 12.

Interposed between the inner and outer rims 5 and 7 is the resilient structure of the wheel, which is made up of numerous springs 13 each of flat strips of spring metal bent or bowed and which have their intermediate parts or arches each secured to the rim 5 by a screw, nut and washer 14. The shank of the screw passes through a hole 15 in the spring and the nut is located on the outer face of the rim 5. The heads of the screws are countersunk on the inner face of the rim 5 so that the latter will have a smooth inner surface, presenting no obstruction and permitting easy slipping on and off of the felly 3. The screw and nut construction affords means for quick and easy disconnection of each spring, independently of all others.

The springs 13 have their general extent disposed obliquely or angularly cross-wise in relation to the rims 5 and 7 and their ends extend in parallel relation to each other where they lie against the rim 7, as shown at 16. The end of one spring lies under the end of the next spring in advance thereof and each end of each spring is provided with two holes 17, 18, through which pass screws 19, 20, securing the said ends to the rim 7. By thus underlapping and overlapping the ends of the springs and securing each end at two points, the said ends are securely anchored against displacement and yet the springs may be easily removed by taking out the screws 19 and 20 and also removing the screws and nuts 14.

The peculiar form of the springs and their relationship affords ample resiliency without danger of relative lateral buckling or displacement of the rims 5 and 7, or displacement thereof to any appreciable extent by torsional action, and thus the resilient structure has ample strength.

What I claim is:

A spring wheel having inner and outer rims and bowed springs whose bowed or arched parts are detachably connected to one of the rims and whose ends are spaced apart transversely of the other rim and connected thereto, said springs having their general extent or length disposed obliquely or angularly crosswise in relation to the said rims and being provided with ends which lie in the plane of the wheel.

In testimony whereof I affix my signature.

LOUI COMPE.